United States Patent [19]

Ohama et al.

[11] Patent Number: 5,447,984
[45] Date of Patent: Sep. 5, 1995

[54] CURABLE POLYMER MORTAR OR CONCRETE COMPOSITIONS

[75] Inventors: Yoshihiko Ohama, Kanagawa; Katsunori Demura, Fukushima; Hirokazu Matsueda, Aichi; Tatsuhiko Ozaki, Aichi; Atsushi Kodama, Aichi, all of Japan

[73] Assignee: Takemoto Yushi Kabushiki Kaisha, Japan

[21] Appl. No.: 345,191

[22] Filed: Nov. 28, 1994

[30] Foreign Application Priority Data

Mar. 28, 1994 [JP] Japan .................................. 6-082203
Aug. 22, 1994 [JP] Japan .................................. 6-220932

[51] Int. Cl.$^6$ ........................ C08K 5/521; C08L 75/14
[52] U.S. Cl. .................................... 524/507; 524/521; 524/140; 524/141; 524/145; 524/147
[58] Field of Search ............... 524/507, 521, 140, 141, 524/145, 147

Primary Examiner—Paul R. Michl
Assistant Examiner—Olga Asinovsky
Attorney, Agent, or Firm—Majestic, Parsons, Siebert & Hsue

[57] ABSTRACT

Curable polymer mortar or concrete compositions with improved workability and processability use polymerizable liquid resin composed of unsaturated urethane of a specified form and vinyl monomers as binder and also contain an inorganic powder filler, aggregates and a viscosity reducer of a specified kind and a low shrinking agent of a specified kind each at a specified rate. Cured compositions with improved accuracy in measurements, strength and water absorption can be obtained from such compositions. Self-leveling property can also be provided.

11 Claims, No Drawings

CURABLE POLYMER MORTAR OR CONCRETE COMPOSITIONS

BACKGROUND OF THE INVENTION

This invention relates to curable polymer mortar or concrete compositions (hereinafter "nonaqueous compositions") and self-leveling polymer mortar or concrete compositions for making a horizontal floor surface (hereinafter "self-leveling nonaqueous compositions"). Nonaqueous compositions using polymerizable liquid resins containing radical polymerizable monomers and macromers are being used widely as a binder. For example, nonaqueous compositions using unsaturated polyester resin as polymerizable liquid resin are being used as construction materials such as floor coating agent, pavement material and pre-cast products. This invention relates to nonaqueous compositions and self-leveling nonaqueous compositions using polymerizable liquid resin containing unsaturated urethane of a specified structure as binder.

There have been disclosed nonaqueous compositions using as binder unsaturated polyester resins (Japanese Patent Publications Tokko 62-12934 and 62-143916), polymerizable liquid resin containing unsaturated urethane obtained from polyisocyanate and hydroxyalkyl (meth)acrylate (Japanese Patent Publications Tokkai 54-33585, 54-36392 and 54-36390) and polymerizable liquid resin containing (meth)acrylic partial ester of polyhydric alcohol and other vinyl monomers (Japanese Patent Publications Tokko 1-30777 and 3-3623).

These prior art nonaqueous compositions, however, have the following problems. (1) As for those which use unsaturated polyester resin as binder, their viscosity increases, and a composition with good flowability cannot be obtained if they are mixed with an inorganic powder filler or aggregates. Moreover, a long time is required for hardening, and this affects workability and processability adversely. (2) As for those which use polymerizable liquid resin containing (meth)acrylic partial ester of polyhydric alcohol and other vinyl monomers or aforementioned unsaturated polyester resin as binder, they lose their strength if they stay in contact with water for an extended period of time, and products with good water-proofing property cannot be obtained. (3) As for those which use as binder polymerizable liquid resin containing unsaturated urethane obtained from polyisocyanate and hydroxyalkyl (meth)acrylate, their workability and processability are limited because they have high melting points and hence solidify below normal temperature or generate precipitates.

If such prior art nonaqueous compositions are used for floor construction, furthermore, there are the following additional problems. (4) Their flowability is bad and much work and a long time would be required for floor construction. (5) They have poor adhesive property with the ground, or the surface of concrete placing, and hence some primer treatment would be necessary on the surface of concrete placement prior to the ground construction. (6) If a shrinkage reducing agent is added to prevent the occurrence of cracks by reducing shrinkage at the time of hardening and also to improve accuracy in measurements, desired strength and water-proofing property cannot be obtained after hardening.

SUMMARY OF THE INVENTION

It is therefore an object of the invention to provide nonaqueous compositions with which the problems (1)–(3) given above can be overcome and self-leveling nonaqueous compositions for floor construction with which the problems (4)–(6) give above can be overcome.

As a result of diligent studies in view of the objects given above, the present inventors have discovered that nonaqueous compositions, which use polymerizable liquid resin comprising unsaturated urethane of a specified structure and vinyl monomer as binder and to which an inorganic powder filler, aggregates, a specified viscosity reducer and a specified low shrinking agent are added at specified ratios, are desirable and that, for using such nonaqueous compositions for floor construction, it is necessary to more narrowly specify some of the conditions and that a mineral oil should be added when a nonaqueous composition described above is used for floor construction.

DETAILED DESCRIPTION OF THE INVENTION

This invention relates to nonaqueous compositions comprising a binder as specified below, an inorganic powder filler, an aggregate, a viscosity reducer as specified below and a low shrinking agent as specified below, 300–1150 weight parts of the inorganic powder filler and the aggregate together, 0.1–1 weight part of the viscosity reducer and 1–50 weight parts of the low shrinking agent being contained for 100 weight parts of the binder. The binder is specified as a polymerizable liquid resin comprising unsaturated urethane shown by Formula 1 given below and vinyl monomers which are copolymerizable with this unsaturated urethane at weight ratio of (unsaturated urethane)/(vinyl monomers)=30/70–70/30:

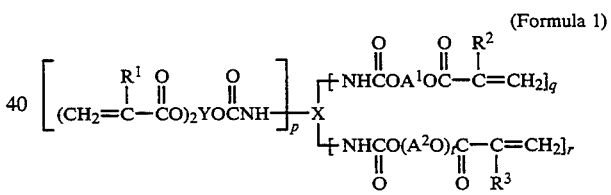

where X is a residual group obtained by removing isocyanate group from polyisocyanate; Y is a residual group obtained by removing hydroxyl groups from trihydric alcohol; $A^1$ is alkylene group with 2–6 carbon atoms; $A^2$ is alkylene group with 2–4 carbon atoms; $R^1$, $R^2$ and $R^3$ are each H or $CH_3$; p and r are integers 0–2 but cannot both be 0; q is an integer 1–3 such that $2 \leq p+q+r \leq 4$; and t is an integer 2–5. The viscosity reducer is specified as being an anionic polymeric surface active agent shown by Formula 2 give below:

where R is a hydrocarbon group selected from the group consisting of alkyl groups with 1–6 carbon atoms, cyclohexyl group, phenyl group and phenyl group substituted by alkyl group with 1–4 carbon atoms; A is a residual group obtained by removing hydroxyl group from polyetherdiol with repetition number of oxyalkylene units 5–100 wherein the oxyalkylene units include both those which consist entirely of oxypropylene units and those which comprise 30% or more of oxypropylene units and 70% or less of oxyethylene units; M is either H or a monovalent base; m and n are each 1 or 2 such that m+n=3; and the low shrinking agent is specified as a thermoplastic polymer of one or more kinds selected from the group consisting of polyalkyl (meth)acrylates, saturated aliphatic polyesters, aromatic vinyl polymers and vinyl copolymers having vinyl aromatic hydrocarbons as monomer component.

The unsaturated urethane shown by Formula 1 is a compound obtained by a reaction between (meth)acryl ester monool and polyisocyanate as described below.

Examples of the aforementioned (meth)acryl ester monool include alkanetriol di(meth)acrylates derived from (meth)acrylic acid and alkanetriol, alkanediol mono(meth)acrylates derived from (meth)acrylic acid and alkanediol, and polyetherdiol mono(meth)acrylates derived from (meth)acrylic acid and polyetherdiol.

Examples of the aforementioned alkanetriol di(meth)acrylates include di(meth)acrylates of alkanetriols with alkane having 3–6 carbon atoms such as glycerine di(-meth)acrylate, trimethylolpropane di(meth)acrylate, and 1,2,6-hexanetriol di(meth)acrylate.

Examples of the aforementioned alkanediol mono(meth)acrylates include mono(meth)acrylates of alkanediols with alkane having 2–6 carbon atoms such as 2-hydroxyethyl (meth)acrylate, 2-hydroxypropyl (meth)acrylate, and 1,6-hexanediol mono(meth)acrylate.

Examples of the aforementioned polyetherdiol mono(meth)acrylates include mono(meth)acrylates of polyetherdiol to which 2–5 moles of alkylene oxide with 2–4 carbon atoms is added such as diethyleneglycol mono(meth)acrylate, tripropyleneglycol mono(meth)acrylate, tetraethyleneglycol (meth)acrylate and pentabutyleneglycol mono(meth)acrylate.

Examples of polyisocyanate, which is caused to react with such (meth)acryl estermonools, include di- to tetra-isocyanates. Examples of such polyisocyanate include: (1) aromatic diisocyanates and diisocyanates having aromatic group such as many kinds of tolylene diisocyanate, diphenylether-4,4'-diisocyanate, diphenylmethane diisocyanate, tolylene diisocyanate, and xylene diisocyanate; (2) tri- or tetraisocyanates such as dimethylene triphenyl triisocyanate and trimethylene tetraphenyl tetraisocyanate; and (3) polymethylene polyphenyl polyisocyanates having 2–4 isocyanate groups in the molecule on the average. Of these polyisocyanates, it is preferable to use polArmethylene polyphenyl polyisocyanate having 2.5–3 isocyanate groups on the average.

Regarding the unsaturated urethane to be used for the nonaqueous compositions according to the present invention, examples of (meth)acryl estermonool to be reacted with polyisocyanate include: (1) combined use of alkanediol mono(meth)acrylate and alkanetriol di(meth)acrylate; (2) combined use of alkanediol mono(meth)acrylate and polyetherdiol mono(meth)acrylate; and (3) combined use of alkanediol (meth)acrylate, alkanetriol di(meth)acrylate and polyetherdiol mono(meth)acrylate. If (meth)acryl estermonool is selected as above, it is possible to attain both stability for the polymerizable liquid resin which is obtained and desired properties for the cured objects obtained from nonaqueous compositions containing such polymerizable resins. By contrast, if use is made only of alkanediol mono(meth)acrylate as (meth)acryl estermonool, for example, the polymerizable liquid resin which is obtained may generate sediments or be easily solidified, when it is cooled. If use is made only of polyetherdiol mono(meth)acrylate, only of alkanetriol di(meth)acrylate or a mixture of them as (meth)acryl estermonool, as another example, it is not possible to obtain cured objects with desired properties.

Regarding the unsaturated urethane to be used for the nonaqueous compositions according to the present invention, the total number of (meth)acryloxy groups which may be contained in the molecule should be in the range of 2 to a maximum of 6, and preferably between 2 and 4. If two or more kinds of unsaturated urethane are used, the total number of (meth)acryloxy groups should preferably be 2.5–3.5 on the average. Such unsaturated urethane is obtained by appropriately selecting the number of isocyanate groups in the polyisocyanate and the kind of (meth)acryl estermonool to be used for the synthesis.

When the unsaturated urethane is synthesized, the ratio of polyisocyanate to (meth)acryl estermonool should preferably be 1/1 in terms of functional molar ratio (NCO/OH), but it may be varied within the range of 1/0.95–0.95/1. The synthesis of the unsaturated urethane is usually carried out by the method of adding an inactive solvent to (meth)acryl estermonool, further adding a catalyst such as di-n-butyl tin dilaurate, and then slowly adding polyisocyanate while temperature is maintained at 50–80° C. In this method, vinyl monomers such as methyl(meth)acrylate and styrene may be used as the inactive solvent.

Examples of vinyl monomer which is copolymerizable with unsaturated urethane include: (1) methylmethacrylate; (2) alkanediol di(meth)acrylates with 2–6 carbon atoms such as ethyleneglycol diacrylate, propyleneglycol dimethacrylate, 1,4-butanediol diacrylate, neopentylglycol dimethacrylate and 1,6-hexanediol diacrylate; (3) alkanetriol di(meth)acrylates with 3–6 carbon atoms such as glycerine trimethacrylate, 1,2,6-hexanetriol triacrylate, and trimethylolpropane trimethacrylate, and (4) vinyl aromatic hydrocarbons such as styrene, methylstyrene and divinylbenzene. One or more kinds of these may be appropriately used but it is preferable, from the point of view of the properties of the cured objects to be obtained, that use be made of methylmethacrylate and/or styrene.

The binder to be used for the nonaqueous compositions according to the present invention comprises unsaturated urethane shown by Formula 1 and vinyl monomers which are copolymerizable therewith at the weight ratio (unsaturated urethane)/(vinyl monomers) between 30/70 and 70/30, and preferably between 40/60 and 55/45.

Nonaqueous compositions according to the present invention contain an inorganic powder filler. Examples of such inorganic powder filler include calcium carbonate, silica, clay, talc and aluminum hydroxide. The invention does not impose any particular limitation on their particle size, shape or size distribution, but use is generally made of those with average particle diameter greater than 0.1μm, and preferably in the range of 1–100μm.

Examples of aggregates contained by the nonaqueous compositions according to the present invention include fine aggregates such as siliceous sand, river sand, mountain sand and glass beads, and coarse aggregates such as river gravel and grind rocks. The total content of the inorganic powder filler and the aggregate is 300–1150 weight parts against 100 weight parts of the binder, although this depends on their kinds, particle diameters, the method of curing the nonaqueous composition prepared therefrom and the desired properties of the cured objects.

There is no particular limitation to be imposed on the content of the inorganic powder filler in a nonaqueous composition according to this invention but it is preferably 50–300 weight parts, and more preferably 100–200 weight parts against 100 weight parts of the binder.

If the content of inorganic powder filler or aggregates is increased in the nonaqueous composition according to the present invention, its viscosity necessarily increases and its flowability is adversely affected. In order to keep high the flowability of the nonaqueous composition to be prepared so as to improve its processability and workability, use is made of fan anionic polymeric surface active agent shown by Formula 2 given above.

In Formula 2, A is a residual group obtained by removing hydroxyl group from polyetherdiol, of which the repetition number of oxyalkylene units is 5–100, and more preferably 15–60, and the oxyalkylene units are comprised either entirely of oxypropylene units or of both over 30 molar % of oxypropylene units and less than 70 molar % of oxyethylene units.

In Formula 2, R is a hydrocarbon group which closes one end of the aforementioned polyetherdiol. Examples of such hydrocarbon group include: (1) alkyl groups with 1–6 carbon atoms such as methyl group, ethyl group, isopropyl group, butyl group and hexyl group; (2) cyclohexyl group; (3) phenyl group; and (4) phenyl groups substituted by alkyl group with 1–4 carbon atoms such as methylphenyl group and isobutylphenyl group. Of the above, alkyl groups with 1–4 carbon atoms are preferred.

A known method may be used for producing polyetherdiol with one end closed by a hydrocarbon group. This may be done, for example, by sequentially adding 1,2-alkylene oxide of a specified molar number to one mole of alcohol or phenol in the presence of a basic catalyst to obtain polyoxy alkylenediol with one end closed with alkyl group or phenyl group.

The anionic polymeric surface active agent shown in Formula 2 is an ester of phosphoric acid and includes: (1) acidic phosphoric acid monoester obtained by ester bonding of one mole of polyetherdiol with a closed end and phosphoric acid; (2) acidic phosphoric acid diester obtained by ester bonding of two moles of polyetherdiol with a closed end and phosphoric acid; and (3) salts of phosphoric acid esters obtained by neutralizing such acidic phosphoric acid esters with a basic compound. Any known method may be used for producing such phosphoric acid esters. Examples of such method include: (1) the method of obtaining 2 moles of acidic phosphoric acid monoester by reacting 2moles of polyetherdiol with a closed end, 1 mole of water and 1 mole of phosphorus pentoxide; (2) the method of obtaining 1 mole of acidic phosphoric acid monoester and 1 mole of acidic phosphoric acid diester by reacting 3 moles of polyetherdiol with a closed end and 1 mole of phosphorus pentoxide; and (3) the method of obtaining 1 mole of acidic phosphoric acid diester by reacting 2 moles of polyetherdiol with a closed end and 1 mole of phosphorus oxychloride, followed by hydrolysis. Salts of phosphoric acid esters can be obtained by neutralization of such acidic phosphoric acid monoester or acidic phosphoric acid diester with a basic compound. Examples of such basic compound to be used for neutralization include: (1) inorganic basic compounds such as sodium hydroxide, potassium hydroxide and lithium hydroxide; and (2) organic basic compounds such as ammonia, monoethanolamine, diethanolamine, triethanolamine, alkylamine, quaternary ammonium hydroxide, and phosphonium hydroxide. Of these phosphoric acid esters, acidic phosphoric acid esters are preferred, and those containing over70 molar % of acidic phosphoric acid monoesters and less than 30 molar % of acidic phosphoric acid diesters are particularly preferred.

According to the present invention, 0.1–1 weight part of viscosity reducer is contained against 100 weight parts of the binder. Such a viscosity reducer is particularly effective with nonaqueous compositions containing a binder by less than 15 weight % with respect to the total of the inorganic powder filler and the aggregates and further wherein the binder is contained at a low rate of less than 10 weight %.

The nonaqueous compositions according to this invention contain thermoplastic polymers as low shrinking agent in order to prevent shrinkage at the time of curing and to obtain a cured object with high accuracy in measurements. Examples of such thermoplastic polymer include: (1) polyalkyl (meth)acrylates obtained by polymerization of methyl methacrylate, isobutyl methacrylate and 2-ethylhexyl acrylate; (2) saturated aliphatic polyesters such as polyneopentyl adipate, polypropylene adipate and poly ε-caprolactone; and (3) aromatic vinyl polymers and vinyl copolymers having aromatic vinyl polymer as monomer component such as polystyrene, styrene-butadien copolymers, styrene-divinylbenzene copolymers, and styrene-acrylonitrile copolymers.

The thermoplastic polymers to be used as low shrinking agents should preferably have compatibility with the polymerizable liquid resins used as a binder and glass transition temperature of less than 80° C. Particularly preferable are polyalkyl (meth)acrylates having alkyl group with 1–8 carbon atoms, and even more preferable are those with 1–5 carbon atoms. The content of low shrinking agent in a nonaqueous composition according to this invention is 1–50 weight parts, and more preferably 3–15 weight parts, against 100 weight parts of the binder.

Nonaqueous compositions according to this invention can be used for floor construction. For this application, it is advantageous to further specify the kind of aforementioned polymerizable liquid resins and to add a mineral oil at a specified proportion in order to provide a desired self-leveling property to the nonaqueous composition.

Self-leveling nonaqueous compositions for floor construction according to this invention contain a binder as specified below, an inorganic powder filler, aggregates, a viscosity reducer as specified below, a low shrinking agent as specified below and a mineral oil. The total of the inorganic powder filler and the aggregates is 400–1150 weight parts, the viscosity reducer is 0.1–1 weight part, the low shrinking agent is 3–15 weight parts and the mineral oil is 2–5 weight parts against 100 weight parts of the binder.

The binder as specified consists of unsaturated urethane shown by Formula 1 given above and one or more kinds of vinyl monomers selected from methyl methacrylate and styrene such that the weight ratio (unsaturated urethane)/(vinyl monomers) is 30/70–65/35. The viscosity reducer as specified is an anionic polymeric surface active agent shown by Formula 2 given above. The low shrinking agent as specified is polyalkyl (meth)acrylate having alkyl group with 1-8 carbon atoms.

The binder to be used in self-leveling nonaqueous compositions according to this invention has been said to consist of unsaturated urethane shown by Formula 1 given above and one or more kinds of vinyl monomers selected from methyl methacrylate and styrene such that the weight ratio (unsaturated urethane)/(vinyl monomers) is 30/70-65/35, but this weight ratio should more preferably be in the range of 40/60 to 55/45. If the ratio is not within this range, the nonaqueous composition containing such binder cannot serve desired purposes such as regarding the self-leveling property.

The vinyl monomers to be used with unsaturated urethane for the polymerizable liquid-resins to be used for self-leveling nonaqueous compositions of this invention are methyl methacrylate and/or styrene. They may be used singly or as a mixture in an appropriate manner, but it is preferable to use them as a mixture of methyl methacrylate and styrene from the point of view of the properties of cured objects which are to be obtained. It is further preferable that their weight ratio be (methyl methacrylate)/(styrene) = 50/50-80/20.

As explained above, self-leveling nonaqueous compositions according to this invention contain both an inorganic powder filler and aggregates. The total content of the inorganic powder filler and the aggregates is 400-1150 weight parts against 100 weight parts of the binder. There is no particular limitation on the content of the inorganic powder filler with respect to the binder but it is preferably 50-300 weight parts, and even more preferably 100-200 weight parts against 100 weight parts of the binder.

Viscosity reducers of the kind mentioned above are also used in self-leveling nonaqueous compositions of this invention for providing self-leveling property to a nonaqueous composition and to thereby improve their processability and workability. Preferred manners of accomplishing this purpose are as explained above.

Self-leveling nonaqueous compositions according to this invention contain a low shrinking agent for the purpose of providing floor construction materials with high accuracy in measurements which can prevent shrinkage at the time of curing and do not crack. Use is made, as low shrinking agent for this purpose, of polyalkyl (meth)acrylates having alkyl group with 1-8 carbon atoms and more preferably polyalkyl (meth)acrylates having alkyl group with 1-5 carbon atoms. Such a low shrinking agent is contained at weight ratio of 3-15 weight parts, or preferably 5-10 weight parts, against 100 weight parts of the binder.

Self-leveling nonaqueous compositions according to this invention contain a mineral oil for the purpose of preventing curing inhibition in air. Examples of such mineral oil include liquid paraffin with kinetic viscosity less than $50 \times 10^{-6}$ m²/s at 30° C., but liquid paraffin with kinetic viscosity at 30° C. of $1 \times 10^{-6}$ m²/s-$10 \times 10^{-6}$ m²/s is more preferred. Such mineral oil is contained at weight ratio of 2-5 weight parts against 100 weight parts of the binder. If the content of the mineral oil is below this range, desired effects cannot be attained. If the content of the mineral oil is above this range, corresponding effects cannot be expected.

Nonaqueous compositions and self-leveling nonaqueous compositions according to this invention can be cured in the presence of a curing agent and may be prepared and cured by known methods applicable to nonaqueous compositions containing polymerizable liquid resin (curable polymer mortar or concrete compositions). For example, many kinds of curing agent and curing accelerator can be used for radical polymerization. Examples of such curing agent include benzoyl peroxide, t-butyl peroxy-2-ethylhexanoate, t-butyl peroxybenzoate, 1,1-di-t-butyl peroxy-3,3,5-trimethyl cyclohexane, and bis(4-t-butyl cyclohexyl)peroxy dicarbonate. They may be used singly or as a mixed system of one or more. Examples of curing accelerator include cobalt naphthenide and tertiary amines such as N,N-dimethyl-p-toluidine and N,N-dimethyl aniline. The rate at which the curing agent is used depends on the curing temperature but is usually 0.1-5 weight % with respect to the binder. When a nonaqueous composition or self-leveling nonaqueous composition of this invention is cured under normal temperature, the kinds and amounts of the curing agent and curing accelerator should preferably be determined such that the usable time of the binder at normal temperature will be normally 20-60 minutes.

Nonaqueous compositions according to this invention contain stable polymerizable liquid resin which does not generate solids or sediments at normal temperatures. Since their flowability is good, their workability and processability is superior. Since cured objects obtained therefrom have small shrinkage upon curing, they do not crack and products with superior accuracy in measurements, strength and water resistance can be obtained. Thus, nonaqueous compositions according to this invention can be used for the production of precast products and in processes such as floor coating and paving. In particular, self-leveling nonaqueous compositions of this invention for floor construction have good flowability at the time of floor construction in addition to the aforementioned properties of nonaqueous compositions, and cured objects obtained therefrom have improved adhesion property with the ground, or the surface of concrete placing. Thus, there is no need for a primer treatment on the surface of concrete placement when use is made of a self-leveling nonaqueous composition according to this invention.

In what follows, test examples will be described in order to more clearly explain the invention and its effects but these examples are not intended to limit the scope of the invention. In what follows, furthermore, "parts" will mean weight parts and "%" will mean weight %, unless explained specifically otherwise.

EXPERIMENTS

Part 1: Synthesis Of unsarated Urethane a And Preparation Of Polymerizable Liquid Resin A Methyl methacrylate (587 parts), 2-hydroxyethyl methacrylate (195 parts, 1.5 mole), diethyleneglycol monomethacrylate (303 parts, 1.5 mole) and di-n-butyl tin dilaurate (2 parts) were placed in a reactor and stirred while being kept at 50° C. Polymethylene polyphenyl polyisocyanate having 3 isocyanate groups on the average in the molecule (382 parts, 1.0 mole) was added to this mixture over a period of 40 minutes. Reaction heat is generated but the reaction temperature was kept below 60° C. The synthesis was completed thereafter by keeping the temperature at 60° C. for one hour to obtain polymerizable liquid resin A containing unsaturated urethane a by 60%. Polymerizable liquid resin A thus obtained was left for 24 hours at 20° C., but no precipitation of unsaturated urethane a was observed.

Similarly to the above, polymerizable liquid resin B containing unsaturated urethane b by 55%, polymerizable liquid resin C containing unsaturated urethane c by 55%, polymerizable liquid resin E containing unsaturated urethane b by 47.5%, and polymerizable liquid resin F containing unsaturated urethane f by 47.5% were obtained. Polymerizable liquid resins B, C, E and F, thus obtained, were left for 24 hours at 20° C., but no precipitation of unsaturated urethane b, c or f was observed.

Synthesis Of unsaturated urethane r-1 And Preparation Of Polymerizable Liquid Resin R-1

2-hydroxyethylμmethacrylate (390 parts, 3.0 moles), methyl methacrylate (515 parts), di-n-butyl tin dilaurate (3 parts) and polymethylene polyphenyl polyisocyanate having 3 isocyanate groups in the molecule on the average (382 parts, 1.0 mole) were used to obtain polymerizable liquid resin R-1 containing unsaturated urethane r-1 by 60% in the same way as described above for the synthesis of unsaturated urethane a and preparation of polymerizable liquid resin A. Polymerizable liquid resin R-1 thus obtained was left for 24 hours at 20° C. and a large amount of unsaturated urethane r-1 was precipitated.

Similarly to the above, polymerizable liquid resin R-2 containing unsaturated urethane r-2 by 60% was obtained. Polymerizable liquid resin R-2 thus obtained was left for one hour at 20° C. and a large amount of unsaturated urethane r-2 was precipitated.

Synthesis Of Unsaturated Urethane q And Preparation Of Polymerizable Liquid Resins G, R-8 And R-9

Methyl methacrylate (148.5 parts), styrene (80 parts), 2-hydroxyethyl methacrylate (130 parts,. 1 mole), diethyleneglycol monomethacrylate (174 parts, 1.0 mole), glycerine dimethacrylate (228 parts, 1.0 mole) and di-n-butyl tin dilaurate (2 parts) were placed in a reactor and stirred while temperature was kept at 50° C. Polymethylene polyphenyl polyisocyanate having 3 isocyanate groups in the molecule on the average (382 parts, 1.0 mole) was added thereto over a period of 40 minutes. Reaction heat was generated but the reaction temperature was kept below 60° C. The synthesis was completed thereafter by keeping the temperature at 60° C. for one hour to obtain polymerizable liquid resin R-8 containing unsaturated urethane g by 80%. Methyl methacrylate (133.4 parts) and styrene (71.9 parts) were added to polymerizable liquid resin R-8 (300 parts) thus obtained, mixed and dissolved to prepare polymerizable liquid resin G containing unsaturated urethane g by 47.5%. Similarly, methyl methacrylate (563.4 parts) and styrene (303.3 parts) were added to polymerizable liquid resin R-8 (200 parts), mixed and dissolved to prepare polymerizable liquid resin R-9 containing unsaturated urethane g by 15%. Polymerizable liquid resins G, R-8 and R-9 thus obtained were left for 24 hours at 20° C., but no precipitation of unsaturated urethane g was observed.

Preparation Of Polymerizable Liquid resins D, R-6 And R-7

Similarly to the synthesis of unsaturated urethane g and preparation of polymerizable liquid resin. R-8 described above, polymerizable liquid resin R-6 containing unsaturated urethane d by 80% was prepared. Similarly to the preparation of polymerizable liquid resins G and R-9, further, polymerizable liquid resin D containing unsaturated urethane d by 47.5% and polymerizable liquid resin R-7 containing unsaturated urethane d by 15% were prepared. Polymerizable liquid resins D, R-6 and R-7 thus obtained were left for 24 hours at 20° C., but no precipitation of unsaturated urethane d was observed.

Synthesis of Unsaturated Urethaner-3 And Preparation Of Polymerizable Liquid Resin R-3

2-hydroxyethyl methacrylate (130 parts, 1.0 moles), polyethyleneglycol (average molecular weight 400) monomethacrylate (936 parts, 2.0 moles), methyl methacrylate (1040 parts), styrene (560 parts), di-n-butyl tin dilaurate (3 parts) and polymethylene polyphenyl polyisocyanate having 3 isocyanate groups in the molecule on the average (382 parts, 1.0 mole) were used to obtain polymerizable liquid resin R-3 containing unsaturated urethane r-3 by 47.5% in the same way as described above for the synthesis of unsaturated urethane g and preparation of polymerizable liquid resin G. Polymerizable liquid resin R-3 thus obtained was left for 24 hours at 20° C. but no precipitation of unsaturated urethane r-3 was observed.

Synthesis Of Unsaturated Urethane r-4 And r-5 And preparation Of Polymerizable Liquid Resins R-4 And R-5

Polymerizable liquid resin R-4 containing unsaturated urethane r-4 by 47.5% and polymerizable liquid resin R-5 containing unsaturated urethane r-5 by 47.5% were prepared similarly to the synthesis of unsaturated urethane r-3 and preparation of polymerizable liquid resin R-3 described above. Polymerizable liquid resins R-4 and R-5 thus obtained were left for 24 hours at 20° C. but no precipitation of unsaturated urethane r-4 or r-5 was observed. The kinds of polyisocyanate used for the synthesis of unsaturated urethane a - g and r-1 - r-5, the kinds of (meth)acryl estermonool and their amounts are shown in Table 1. The kinds of unsaturated urethane and vinyl monomers used for the preparations of polymerizable liquid resins A - G and R-1 - R-9 and their weight ratios are shown in Table 2.

TABLE 1

| | | | Unsaturated Urethane | | | | | |
|---|---|---|---|---|---|---|---|---|
| | | | (Meth)acrylester monool | | | | | |
| | Polyisocyanate | | *1 | | *2 | | *3 | |
| Type | Kind | Amount | Kind | Amount | Kind | Amount | Kind | Amount |
| a | PMI-3 | 382 (1.0) | HEMA | 195 (1.5) | DEMA | 303 (1.5) | — | — |
| b | PMI-2.5 | 316 (1.0) | HPMA | 216 (1.5) | — | — | GDM | 228 (1.0) |
| c | MPI | 250 (1.0) | HEMA | 130 (1.0) | — | — | GDM | 228 (1.0) |
| d | PMI-3 | 382 (1.0) | HEMA | 260 (2.0) | DEMA | 174 (1.0) | — | — |

TABLE 1-continued

| | | | Unsaturated Urethane | | | | | |
| | Polyisocyanate | | \*1 | | \*2 | | \*3 | |
| Type | Kind | Amount | Kind | Amount | Kind | Amount | Kind | Amount |
|---|---|---|---|---|---|---|---|---|
| f | TDI | 174 (1.0) | HEMA | 130 (1.0) | — | — | GDM | 228 (1.0) |
| g | PMI-3 | 382 (1.0) | HEMA | 130 (1.0) | DEMA | 174 (1.0) | GDM | 228 (1.0) |
| r-1 | PMI-3 | 382 (1.0) | HEMA | 390 (3.0) | — | — | — | — |
| r-2 | MPI | 250 (1.0) | HEMA | 260 (2.0) | — | — | — | — |
| r-3 | PMI-3 | 382 (1.0) | HEMA | 130 (1.0) | PEGMA | 936 (2.0) | — | — |
| r-4 | PMI-3 | 382 (1.0) | — | — | — | — | GDM | 684 (3.0) |
| r-5 | PMI-3 | 382 (1.0) | — | — | TEMA | 786 (3.0) | — | — |

In "Amount", upper numbers are weight parts, lower numbers in () are moles.

TABLE 2

| | Polymerizable Liquid Resins | | | | Number of (meth)acryloxy groups in molecule of unsaturated urethane |
| | Unsaturated urethane | Vinyl Monomers | | (Unsaturated urethane)/ (Vinyl monomers) Weight ratio | |
| Type | Kind | Kind | Weight Ratio | | |
|---|---|---|---|---|---|
| A | a | MMA | 100/0 | 60/40 | 3 |
| B | b | MMA/ST | 82/18 | 55/45 | 3.5 |
| C | c | MMA/TPMA | 90/10 | 55/45 | 3 |
| D | d | MMA/ST | 65/35 | 47.5/52.5 | 3 |
| E | b | MMA/ST | 55/45 | 47.5/52.5 | 3.5 |
| F | f | MMA/ST | 75/25 | 47.5/52.5 | 3 |
| G | g | MMA/ST | 65/35 | 47.5/52.5 | 3 |
| R-1 | r-1 | MMA | 100/0 | 60/40 | 3 |
| R-2 | r-2 | MMA | 100/0 | 60/40 | 2 |
| R-3 | r-3 | MMA/ST | 65/35 | 47.5/52.5 | 3 |
| R-4 | r-4 | MMA/ST | 65/35 | 47.5/52.5 | 6 |
| R-5 | r-5 | MMA/ST | 65/35 | 47.5/52.5 | 3 |
| R-6 | d | MMA/ST | 65/35 | 80/20 | 3 |
| R-7 | d | MMA/ST | 65/35 | 15/85 | 3 |
| R-8 | g | MMA/ST | 65/35 | 80/20 | 4 |
| R-9 | g | MMA/ST | 65/35 | 15/85 | 4 |

In Tables 1 and 2:
*1: Alkanediol mono(meth)acrylate
*2.: Polyetherdiol mono(meth)acrylate
*3: Triol di(meth)acrylate
PMI-3: Polymethylene polyphenyl polyisocyanate (3 NCO groups on the average)
PMI-2.5: Polymethylene polyphenyl polyisocyanate (2.5 NCO groups on the average)
MPI: Methylene bisphenyl isocyanate
TDI: Tolylene diisocyanate
HEMA: 2-hydroxyethyl methacrylate
HPMA: 2-hydroxypropyl methacrylate
DEMA: Diethylglycol monomethacrylate
PEGMA: PEG (average molecular weight 400) monomethacrylate
TEMA: Tetraethyleneglycol monomethacrylate
GDM: Glycerine dimethacrylate
MMA: Methyl methacrylate
ST: Styrene
TPMA: Trimethylolpropane trimethacrylate

Part 2: Preparation and Evaluation Of Nonaqueous Compositions

Preparation of Nonaqueous Compositions (Curable Polymer Mortar or concrete Compositions)

The procedure according to JIS (Japanese Industrial Standard) A1181 (Method of Making Polyester Resin Concrete Specimens) was followed to prepare nonaqueous compositions (curable polymer mortar or concrete compositions) as shown in Table 3 with weight ratio of (binder)/(filler)/(aggregates)=100/200/800 and nonaqueous compositions (curable polymer concrete compositions) as shown in Table 4 with weight ratio (binder)/(filler)/(aggregates)=100/200/800. The materials used for this part of the experiments are described below. For the measurements of slump and slump flow, samples not containing any curing agent or curing accelerator were prepared.

Materials

Binders were as shown in Tables 3 and 4. Filler was heavy calcium carbonate (particle diameter less than 2.5μm, specific weight 2.70, water content less than 0.1%). In the case of nonaqueous compositions shown in Table 3 (curable polymer mortar compositions), an equal mixture (in weight) of No. 4 siliceous sand (particle diameter 0.70–1.17mm, specific weight 2.51, water content less than 0.1%) and No. 7 siliceous sand (particle diameter 0.05-0.21 mm, specific weight 2.51 and water content less than 0.1%) was used as fine aggregate. In the case of nonaqueous compositions shown in Table 4 (curable polymer concrete compositions), grind rock A (particle diameter 5-10 mm) and grind rock B (particle diameter 10-20 mm) from Isawa, Yamanashi Prefecture were used as coarse aggregates and river sand C (particle diameter 1.2-5 mm) and river sand D (particle diameter less than 1.2 mm) from Fujigawa River of Shizuoka Prefecture were dried until the water content was less than 0.1% and they were mixed at the weight ratio (grind rock A)/(grind rock B)/(river sand C)/(river sand D)=20/20/12/48. Viscosity reducers, low shrinking agents, curing agents and curing accelerators were as shown in Tables 3 and 4. The used amounts of curing agents and curing accelerators were such that the usable time according to JIS K6833 (General Testing Methods for Adhesives) for the binder at 20° C. would be 35±5 minutes.

Measurements of slump and Slump Flow

Slump tests were carried out according to JIS A1173 (Method of Test for Slump of Polymer-Modified Mortar). Use was made of a flat glass plate with a calibrated tape attached to the back surface according to JIS R3202 (Float and Polished Plate Glasses). In the slump tests, slump was measured when the flow stopped after the slump cone was pulled up. The spread at the bottom at this moment was measured on the glass and treated as the slump flow. The results of the tests are shown in Tables 3 and 4.

TABLE 3

| Sample | Binder | Viscosity Reducer | | Low Shrinking Agent | | Curing Agent | | Curing Accelerator | | Slump | Slump Flow |
|---|---|---|---|---|---|---|---|---|---|---|---|
| Kind | Amount | Kind | Amount | Kind | Amount | Kind | Amount | Kind | Amount | (cm) | (cm) |
| Test Examples | | | | | | | | | | | |
| 1 | A | P-1 | 0.05 | S-1 | 7.5 | BPO | 0.25 | DMT | 0.25 | 9 | 14 |
| 2 | B | P-1 | 0.05 | S-1 | 7.5 | BPO | 0.25 | DMT | 0.25 | 12 | 17 |
| 3 | B | P-2 | 0.05 | S-2 | 7.5 | BPO | 0.25 | DMT | 0.25 | 9 | 15 |
| 4 | C | P-1 | 0.05 | S-1 | 7.5 | BPO | 0.25 | DMT | 0.25 | 11 | 16 |
| 5 | C | P-3 | 0.05 | S-2 | 7.5 | BPO | 0.25 | DMT | 0.25 | 9 | 15 |
| Comparison Examples | | | | | | | | | | | |
| 1 | R-1 | — | — | — | — | BPO | 0.25 | DMT | 0.25 | 0 | 10 |
| 2 | R-2 | — | — | — | — | BPO | 0.25 | DMT | 0.25 | 0 | 10 |
| 3 | R-10 | — | — | — | — | *4 | 0.50 | NaCo | 0.25 | 0 | 10 |
| 4 | R-11 | — | — | S-1 | 7.5 | *4 | 0.50 | NaCo | 0.25 | *5 | *5 |

TABLE 4

| Sample | Binder | Viscosity Reducer | | Low Shrinking Agent | | Curing Agent | | Curing Accelerator | | Slump | Slump Flow |
|---|---|---|---|---|---|---|---|---|---|---|---|
| Kind | Amount | Kind | Amount | Kind | Amount | Kind | Amount | Kind | Amount | (cm) | (cm) |
| Test Examples | | | | | | | | | | | |
| 6 | A | P-1 | 0.04 | S-1 | 7.5 | BPO | 0.25 | DMT | 0.25 | 11 | 15 |
| 7 | B | P-1 | 0.04 | S-1 | 7.5 | BPO | 0.25 | DMT | 0.25 | 13 | 17 |
| 8 | B | P-2 | 0.04 | S-2 | 7.5 | BPO | 0.25 | DMT | 0.25 | 10 | 15 |
| 9 | C | P-1 | 0.04 | S-1 | 7.5 | BPO | 0.25 | DMT | 0.25 | 13 | 17 |
| 10 | C | P-3 | 0.04 | S-2 | 7.5 | BPO | 0.25 | DMT | 0.25 | 10 | 14 |
| Comparison Examples | | | | | | | | | | | |
| 5 | R-1 | — | — | — | — | BPO | 0.25 | DMT | 0.25 | 0 | 10 |
| 6 | R-2 | — | — | — | — | BPO | 0.25 | DMT | 0.25 | 0 | 10 |
| 7 | R-10 | — | — | — | — | *4 | 0.50 | NaCo | 0.25 | 0 | 10 |
| 8 | R-11 | — | — | S-1 | 7.5 | *4 | 0.50 | NaCo | 0.25 | *5 | *5 |

In Tables 3 and 4:
Amount: In units of weight part
A-C, R-1, R-2: Polymerizable liquid resins prepared in Part 1 (R-1 and R-2 were used by stirring precipitates.)
R-10: Unsaturated polyester resin (orthophthalic acid unsaturated polyester)/styrene) = 50/50 in weight)
R-11: Polymerizable liquid resin with 60 parts of trimethylolpropane dimethacrylate mixed and dissolved in 40 parts of methyl methacrylate
P-1: Acidic phosphoric acid ester (monoester/diester = 90/10 mole ratio) with butoxypolyoxypropylene(16 mole)/polyoxyethylene(9 mole)glycol
P-2: Methoxypolyoxypropylene(30 mole)glycol acidic phosphoric acid ester (monoester/diester = 75/25 mole ratio)
P-3: Phenoxypolyoxypropylene(50 moles)glycol acidic phosphoric acid ester diethanol salt (monoester/diester = 55/45 mole ratio)
S-1: Polyisobutyl methacrylate (numerical average molecular weight 50000)
S-2: Polyethyl acrylate (numerical average molecular weight 45000)
BPO: Dibenzoyl peroxide
*4: Methylethylketone peroxide
DMT: N,N-dimethyl-p-toluidine
NaCo: Cobalt naphthenide
*5: Viscosity was too high for uniform kneading and sample for evaluation could not be produced.

Part 3: Production Of Cured Objects and Evaluation of Their Strength

Production Of Cured Objects

The nonaqueous compositions shown in Table 3 (curable polymer mortar compositions) and shown in Table 4 (curable polymer concrete compositions) prepared in Part 2 were molded into the size of 40×40×160mm according to JIS A1181. After they were subjected to a dry curing process under the conditions of 20° C.×50%RH in part for 28 days and in part for one day, they were heated for curing under the conditions of 70° C.×15 hours to obtain cured test samples.

Method of Testing

Flexural strength was tested by the method of loading at three equidistant points according to JIS A1184 (Method of Test for Flexural Strength of Polyester Resin Concrete). Compressive strength was measured according to JIS A1183 (Method of Test for Compressive Strength of Polyester Resin Concrete Using Portions of Beams Broken in Flexure). Test results are shown in Tables 5 and 6.

The rates of length change were also measured on the nonaqueous compositions in Table 3 (curable polymer concrete compositions) and those in Table 4 (curable polymer concrete compositions) prepared in Part 2 according to JIS A1129 (Methods of Test for Length Change of Mortar and Concrete). Test results are also shown in Tables 5 and 6.

TABLE 5

| Sample | Compressive Strength ($\times 10^5$Pa) | | Flexural Strength ($\times 10^5$Pa) | | Rate of Length Change (%) |
|---|---|---|---|---|---|
| | Dry Curing Only | Heating After Dry Curing | Dry Curing Only | Heating After Dry Curing | |
| Test Example | | | | | |
| 1 | 443 | 455 | 129 | 144 | −0.01 |
| 2 | 521 | 530 | 146 | 152 | 0.00 |
| 3 | 549 | 584 | 149 | 154 | −0.01 |
| 4 | 543 | 579 | 147 | 150 | 0.00 |
| 5 | 537 | 570 | 143 | 146 | −0.02 |
| Comparison Example | | | | | |
| 1 | 275 | 421 | 74 | 130 | −0.60 |
| 2 | 235 | 381 | 72 | 111 | −0.62 |
| 3 | 382 | 402 | 113 | 125 | −0.55 |
| 4 | *6 | *6 | *6 | *6 | *6 |

TABLE 6

| Sample | Compressive Strength ($\times 10^5$Pa) | | Flexural Strength ($\times 10^5$Pa) | | Rate of Length Change (%) |
|---|---|---|---|---|---|
| | Dry Curing Only | Heating After Dry Curing | Dry Curing Only | Heating After Dry Curing | |
| Test Example | | | | | |
| 1 | 553 | 619 | 168 | 193 | 0.00 |
| 2 | 618 | 685 | 179 | 198 | 0.00 |
| 3 | 541 | 628 | 159 | 181 | −0.01 |
| 4 | 555 | 644 | 167 | 186 | 0.00 |
| 5 | 509 | 613 | 153 | 180 | −0.01 |
| Comparison Example | | | | | |
| 1 | 418 | 481 | 88 | 127 | −0.58 |
| 2 | 396 | 461 | 82 | 117 | −0.60 |
| 3 | 431 | 461 | 119 | 151 | −0.51 |
| 4 | *6 | *6 | *6 | *6 | *6 |

In Tables 5 and 6:
*6: The composition was not uniform and no sample was prepared.
Minus signs in rate of length change indicate shrinking.

Part 4: Preparation of Self-Leveling Nonaqueous Compositions

The procedure according to JIS A1181 (Method of Making Polyester Resin Concrete Specimens) was followed to prepare self-leveling nonaqueous compositions (curable polymer mortar compositions with self-leveling property) as shown in Table 7 with weight ratio (binder)/(inorganic powder filler)/(aggregates) = 100/150/450. The materials used for the preparation were as follows.

Materials

Binders were as shown in Table 7. Filler was heavy calcium carbonate (particle diameter less than 2.5μm, specific weight 2.70, water content less than 0.1%). An equal mixture (in weight) of No. 4 siliceous sand (particle diameter 0.70–1.17 mm, specific weight 2.51, water content less than 0.1%) and No. 7 siliceous sand (particle diameter 0.05–0.21 mm, specific weight 2.51 and water content less than 0.1%) was used as fine aggregate. Viscosity reducers, low shrinking agents, curing agents and curing accelerators were as shown in Table 7. The used amounts of curing agents and curing accelerators were such that the usable time according to JIS K6833 (General Testing Methods for Adhesives) for the binder at 20° C. would be 35±5 minutes.

TABLE 7

| Sample | Binder Kind | Viscosity Reducer Kind | Viscosity Reducer Amount | Low Shrinking Agent Kind | Low Shrinking Agent Amount | Mineral Oil Kind | Mineral Oil Amount | Curing Agent Kind | Curing Agent Amount | Curing Accelerator Kind | Curing Accelerator Amount |
|---|---|---|---|---|---|---|---|---|---|---|---|
| Test Example | | | | | | | | | | | |
| 11 | D | P-1 | 0.3 | S-1 | 8.0 | M-1 | 4 | BPO | 0.25 | DMT | 0.25 |
| 12 | D | P-2 | 0.3 | S-1 | 8.0 | M-1 | 4 | BPO | 0.25 | DMT | 0.25 |
| 13 | E | P-2 | 0.3 | S-3 | 8.0 | M-1 | 2 | BPO | 0.25 | DMT | 0.25 |
| 14 | F | P-2 | 0.3 | S-1 | 8.0 | M-2 | 3 | BPO | 0.25 | DMT | 0.25 |
| 15 | G | P-1 | 0.3 | S-3 | 8.0 | M-1 | 3 | BPO | 0.25 | DMT | 0.25 |
| Comparison Example | | | | | | | | | | | |
| 9 | D | — | 0 | S-1 | 8.0 | M-1 | 4 | BPO | 0.25 | DMT | 0.25 |
| 10 | D | — | 0 | S-1 | 8.0 | — | — | BPO | 0.25 | DMT | 0.25 |
| 11 | D | P-1 | 0.3 | S-1 | 1.0 | M-1 | 4 | BPO | 0.25 | DMT | 0.25 |
| 12 | D | P-1 | 0.3 | S-1 | 20.0 | M-1 | 4 | BPO | 0.25 | DMT | 0.25 |
| 13 | D | — | 0 | — | 0.0 | M-1 | 4 | BPO | 0.25 | DMT | 0.25 |
| 14 | D | P-1 | 0.3 | S-4 | 10.0 | M-1 | 4 | BPO | 0.25 | DMT | 0.25 |
| 15 | R-3 | P-1 | 0.3 | S-1 | 8.0 | M-1 | 4 | BPO | 0.25 | DMT | 0.25 |
| 16 | R-4 | P-1 | 0.3 | S-1 | 8.0 | M-1 | 4 | BPO | 0.25 | DMT | 0.25 |
| 17 | R-5 | P-1 | 0.3 | S-1 | 8.0 | M-1 | 4 | BPO | 0.25 | DMT | 0.25 |
| 18 | R-6 | P-1 | 0.3 | S-1 | 8.0 | M-1 | 4 | BPO | 0.25 | DMT | 0.25 |
| 19 | R-7 | P-1 | 0.3 | S-1 | 8.0 | M-1 | 4 | BPO | 0.25 | DMT | 0.25 |
| 20 | R-8 | P-1 | 0.3 | S-1 | 8.0 | M-1 | 4 | BPO | 0.25 | DMT | 0.25 |

TABLE 7-continued

| Sample | Binder Kind | Viscosity Reducer Kind | Viscosity Reducer Amount | Low Shrinking Agent Kind | Low Shrinking Agent Amount | Mineral Oil Kind | Mineral Oil Amount | Curing Agent Kind | Curing Agent Amount | Curing Accelerator Kind | Curing Accelerator Amount |
|---|---|---|---|---|---|---|---|---|---|---|---|
| 21 | R-9 | P-1 | 0.3 | S-1 | 8.0 | M-1 | 4 | BPO | 0.25 | DMT | 0.25 |

In Table 7:
Amount: In units of weight part
D-G and R-3-R-9: Polymerizable liquid resins prepared in Part 1
M-1: Liquid paraffin with kinetic viscosity at 30° of $3 \times 10^{-6} m^2/s$
M-2: Liquid paraffin with kinetic viscosity at 30° of $38 \times 10^{-6} m^2/s$
P-1: Acidic phosphoric acid ester (monoester/diester = 90/10 mole ratio) with butoxypolyoxypropylene(16 mole)/polyoxyethylene(9 mole)glycol
P-2: Methoxypolyoxypropylene(30 mole)glycol acidic phosphoric acid ester (monoester/diester = 75/25 mole ratio)
S-1: Polyisobutyl methacrylate (numerical average molecular weight 50000)
S-3: Polymethyl methacrylate (numerical average molecular weight 45000)
S-4: Polyvinyl acetate (numerical average molecular weight 50000)
BPO: Dibenzoyl peroxide
DMT: N,N-dimethyl-p-toluidine

Part 5: Evaluation of Flowability of Self-Leveling Nonaqueous Compositions

Slump and slump flow tests as described above were carried out on the self-leveling nonaqueous compositions prepared in Part 4 (not containing any curing agent or curing accelerator). Results are shown in Table 8.

Slump And Slump Flow Tests

Slump tests were carried out according to JIS A1173 (Method of Test for Slump of Polymer-Modified Mortar). Use was made of a flat glass plate with a calibrated tape attached to the back surface according to JIS R3202 (Float and Polished Plate Glasses). In the slump tests, slump was measured when the flow stopped after the slump cone was pulled up. The spread at the bottom at this moment was measured on the glass and treated as the slump flow.

Part 6: Production Of Cured Objects from Self-leveling nonaqueous compositions and evaluation of their strengths The self-leveling nonaqueous compositions prepared in Part 4 were used to produce cured objects as described below. Flexural strength, compressive strength and water proofing property of each of the samples thus produced were tested and evaluated as described below. Each of these samples was used also for measuring the rate of length change. The test results are shown in Table 8.

Production of Samples

Each nonaqueous composition was molded into the size of 40×40×160mm according to JIS A1181 (Method of Making Polyester Resin Concrete Specimens), and samples were obtained by dry curing under the conditions of 20° C.×50%RH for 28 days.

Flexural strength

Flexural strength was tested by the method of loading at three equidistant points according to JIS A1184 (Method of Test for Flexural Strength of Polyester Resin Concrete).

Compressive Strength

Compressive strength was measured according to JIS A1183 (Method of Test for Compressive Strength of Polyester Resin Concrete Using Portions of Beams Broken in Flexure) by using beams broken off in the measurement of flexural strength.

Water Absorption

After each sample was immersed in hot water at 98° C. for 28 days, its compressive strength was measured and the ratio (Compressive Strength After immersion)/(Compressive Strength Before Immersion) was calculated from its compressive strength before the immersion. The water absorption of each sample was evaluated as follows:
A: Ratio is 98% or greater
B: Ratio is 95% or greater but less than 98%
C: Ratio is less than 95%

Rates of Length change

The rates of length change were measured according to JIS A1129 (Methods of Test for Length Change of Mortar and Concrete) by using each nonaqueous compound.

Part 7: Floor construction Tests

Each sample of self-leveling nonaqueous composition prepared in Part 4 was used for floor construction with pieces of length 1 m, width 5 m and thickness 15 mm. Workability and external appearance after the curing were evaluated, and the strength of adhesion with the ground was measured as follows after the curing. The test results are shown in Table 8.

Workability was evaluated as follows by visually observing the self-leveling property at the time of floor construction:
A: Goodself-leveling property, requiring no finish-up with a trowel;
B: Insufficient self-leveling property, requiring finish-up with a trowel;
C: Poor self-leveling property, requiring significant amount of finish-up with a trowel.

External appearance after the curing was evaluated as follows by visually observing the constructed floor surface:
A. No unevenness is observable and surface is flat;
B: Unevenness is observable;
C: Both unevenness and cracks are observable.

An aqueous cement composition (normal portland cement)/(water)/(fine aggregates)/(coarse aggregates)=389/175/892/847(kg/m³) was placed to serve as the ground and cured for 28 days. Floor construction was made on this cured ground by self-leveling without a primer treatment, and the adhesion property with the ground was measured according to JIS K6833 (General Testing Methods for Adhesives).

TABLE 8

| Sample | Slump (cm) | Slump Flow (cm) | Flexural Strength ($\times 10^{-5}$Pa) | Compressive Strength ($\times 10^{-5}$Pa) | Water Absorption | Rate of Length Change (%) | Workability | External Appearance | Adhesion Strength |
|---|---|---|---|---|---|---|---|---|---|
| Test Example | | | | | | | | | |
| 11 | 13 | 25 | 133 | 511 | A | 0.01 | A | A | 26 |
| 12 | 14 | 27 | 141 | 512 | A | 0.00 | A | A | 24 |
| 13 | 12 | 23 | 149 | 530 | A | 0.00 | A | A | 27 |
| 14 | 14 | 26 | 148 | 526 | A | 0.01 | A | A | 26 |
| 15 | 14 | 27 | 137 | 518 | A | 0.01 | A | A | 25 |
| Comparison Example | | | | | | | | | |
| 9 | 3 | 14 | 125 | 511 | A | 0.01 | C | C | 21 |
| 10 | 3 | 12 | 128 | 517 | A | 0.00 | C | C *7 | 20 |
| 11 | 14 | 28 | 156 | 555 | A | −0.57 | A | C | 20 |
| 12 | 8 | 15 | 82 | 340 | B | 0.01 | B | B | 20 |
| 13 | 4 | 14 | 171 | 585 | A | −0.60 | C | C | 15 |
| 14 | 10 | 20 | 110 | 493 | C | −0.02 | B | A | 20 |
| 15 | 13 | 25 | 90 | 471 | C | 0.01 | A | A | 20 |
| 16 | 13 | 25 | 100 | 530 | A | −0.36 | A | C | 14 |
| 17 | 13 | 25 | 98 | 441 | C | −0.26 | A | B | 19 |
| 18 | 10 | 17 | 148 | 525 | A | −0.62 | B | C | 14 |
| 19 | 13 | 26 | 44 | 108 | B | −0.02 | A | A | 13 |
| 20 | 11 | 19 | 145 | 519 | A | −0.65 | B | C | 14 |
| 21 | 14 | 26 | 77 | 157 | B | −0.02 | A | A | 12 |

In FIG. 8:
*7: Surface has tacking property due to poor curing.
Rate of Length Change: Negative signs mean shrinking.

Effects of the Invention

As is already clear, nonaqueous compositions according to this invention contain as binder polymerizable liquid resins with superior stability which do not produce solids or precipitates at normal temperatures and since their flowability is good, they have superior workability and processability. Since cured compositions obtained therefrom have small shrinkage upon curing, they do not crack and can provide cured objects with superior accuracy in measurements, strength and water absorption. In particular, self-leveling nonaqueous compositions for floor construction according to this invention have self-leveling property in addition to the properties described above because of superior flowability, and cured compositions obtained therefrom adhere strongly to ground, or the surface of concrete placement, and hence no primer treatment is necessary on such a surface.

What is claimed is:

1. A curable polymer mortar or concrete composition comprising a binder, an inorganic powder filler, aggregates, a viscosity reducer and a low shrinking agent;

said inorganic powder filler and said aggregates together being 300–1150 weight parts, said viscosity reducer being 0.1–1 weight part and said low shrinking agent being 1–50 weight parts against 100 weight parts of said binder;

said binder comprising unsaturated urethane shown by Formula 1 and radical polymerizable vinyl monomers at weight ratio of (unsaturated urethane)/(vinyl monomer) = 30/70–70/30, Formula 1 being:

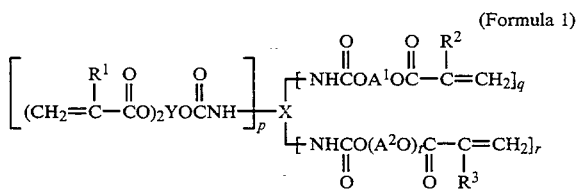

(Formula 1)

wherein X is a residual group obtained by removing isocyanate group from polyisocyanate; Y is a residual group obtained by removing hydroxyl groups from trihydric alcohol; $A^1$ is alkylene group with 2–6 carbon atoms; $A^2$ is alkylene group with 2–4 carbon atoms; $R^1$, $R^2$ and $R^3$ are each H or $CH_3$; p and r are integers 0–2 but cannot both be 0; q is an integer 1–3 such that $2 \leq p+q+r \leq 4$; and t is an integer 2–5;

said viscosity reducer being an anionic polymeric surface active agent shown by Formula 2, which is:

(Formula 2)

wherein R is a hydrocarbon group selected from the group consisting of alkyl groups with 1–6 carbon atoms, cyclohexyl group, phenyl group and phenyl group substituted by alkyl group with 1–4 carbon atoms; A is a residual group obtained by removing hydroxyl group from polyetherdiol with repetition number of oxyalkylene units 5–100 wherein the oxyalkylene units include both those which consist entirely of oxypropylene units and those which comprise 30% or more of oxypropylene units and 70% or less of oxyethylene units; M is either H or a monovalent base; and m and n are each 1 or 2 such that m+n=3; and said low shrinking agent being a thermoplastic polymer of one or more kinds selected from the group consisting of polyalkyl (meth)acrylates, saturated aliphatic polyesters, aromatic vinyl polymers and vinyl copolymers having vinyl aromatic hydrocarbons as monomer component.

2. The curable polymer mortar or concrete composition of claim 1 wherein said radical polymerizable vinyl monomers comprise one or more selected from the group consisting of methyl methacrylate and styrene.

3. The curable polymer mortar or concrete composition of claim 2 wherein said low shrinking agent comprises polyalkyl (meth)acrylate with 1–8 carbon atoms.

4. The curable polymer mortar or concrete composition of claim 1 further comprising a mineral oil and having self-leveling property;

said inorganic powder filler and said aggregates together being 400-1150 weight parts, said low shrinking agent being 3-15 weight and said mineral oil being 2-5 weight parts against 100 weight parts of said binder;

said radical polymerizable vinyl monomers comprising one or more selected from the group consisting of methyl methacrylate and styrene, and said weight ratio (unsaturated urethane)/(vinyl monomer) being 30/70-65/35; and said low shrinking agent comprising polyalkyl (meth)acrylate with 1-8 carbon atoms.

5. The curable polymer mortar or concrete composition with self-leveling property of claim 4 wherein the weight ratio (methyl methacrylate)/(styrene) of said vinyl monomers is 50/50 -80/20.

6. The curable polymer mortar or concrete composition with self-leveling property of claim 4 wherein said weight ratio (unsaturated urethane)/(vinyl monomer) is 40/60-55/45.

7. The curable polymer mortar or concrete composition with self-leveling property of claim 5 wherein Said weight ratio (unsaturated urethane)/(vinyl monomer) is 40/60-55/45.

8. The curable polymer mortar or concrete composition with self-leveling property of claim 4 wherein said inorganic powder filler is 100-200 weight parts against 100 weight parts of said binder.

9. The curable polymer mortar or concrete composition with self-leveling property of claim 5 wherein said inorganic powder filler is 100-200 weight parts against 100 weight parts of said binder.

10. The curable polymer mortar or-concrete composition with self-leveling property of claim 6 wherein said inorganic powder filler is 100-200 weight parts against 100 weight parts of said binder.

11. The curable polymer mortar or concrete composition with self-leveling property of claim 7 wherein said inorganic powder filler is 100-200 weight parts against 100 weight parts of said binder.

* * * * *